US007385327B2

(12) United States Patent
Kondo

(10) Patent No.: US 7,385,327 B2
(45) Date of Patent: Jun. 10, 2008

(54) MOTOR ACTUATOR

(75) Inventor: Yasushi Kondo, Kawasaki (JP)

(73) Assignee: Keihin Corporation, Tokyo (JP)

( * ) Notice: Subject to any disclaimer, the term of this patent is extended or adjusted under 35 U.S.C. 154(b) by 26 days.

(21) Appl. No.: 11/486,277

(22) Filed: Jul. 14, 2006

(65) Prior Publication Data

US 2007/0011864 A1 Jan. 18, 2007

(30) Foreign Application Priority Data

Jul. 14, 2005 (JP) ............................ 2005-205881

(51) Int. Cl.
*H02K 5/00* (2006.01)

(52) U.S. Cl. .......................................... 310/89; 310/71

(58) Field of Classification Search .................. 310/89, 310/71

See application file for complete search history.

(56) References Cited

U.S. PATENT DOCUMENTS 4,866,317 A * 9/1989 Katayama .................... 310/89
5,528,093 A * 6/1996 Adam et al. .................. 310/89
6,906,438 B2 * 6/2005 Ursel et al. .................... 310/89
7,230,356 B2 * 6/2007 Kimura et al. ............ 310/68 B

FOREIGN PATENT DOCUMENTS

JP S62-132262 8/1987

* cited by examiner

*Primary Examiner*—Nguyen N Hanh
(74) *Attorney, Agent, or Firm*—Bacon & Thomas PLLC

(57) ABSTRACT

For easy and accurate assembly of a motor actuator with improvement of quality and productivity, a motor accommodating hole (2) continuously having a pressure insertion hole (2*a*) and an insertion hole (2*b*), and a coupler (4) having terminals (5, 6) are integrally formed in a motor case (1), the insertion hole (2*b*) is open to face to an opening (1*c*) of the motor case (1), the terminals (5, 6) are arranged in parallel to a longitudinal axis (X-X) of the motor accommodating hole (2), flat base plates (7, 8) which are orthogonal to a longitudinal axis (Y-Y) of a motor (3) and have connection holes (7*a*, 8*a*) are arranged in an outer periphery (3*a*) of the motor (3), the terminals (5, 6) are inserted into the connection holes (7*a*, 8*a*) when inserting the motor (3) into the insertion hole (2*b*) and then the motor (3) is pressure-inserted fixedly to the pressure insertion hole (2*a*).

2 Claims, 3 Drawing Sheets

MOTOR ACTUATOR

BACKGROUND OF THE INVENTION

1. Field of the Invention

The present invention relates to a motor actuator in which a motor accommodating hole is formed by a motor case and a motor cover covering the motor case, a motor is arranged within the motor accommodating hole and rotation of an output shaft of the motor is output toward an outer portion directly or via a gear or the like, and the motor actuator is used as a drive actuator for an open and close control of a throttle valve arranged in a throttle body controlling an amount of air flowing toward an engine or for a control of an air jet control apparatus in a carburetor.

2. Description of the Conventional Art

A conventional motor actuator is shown in Japanese Unexamined Utility Model Publication No. 62-132262.

In accordance with the motor actuator mentioned above, U-shaped grooves constituted by bifurcated connection portions are provided in flat base plates protruding sideward from a motor, and leading end portions of terminals provided in a coupler integrally formed in a motor case are formed to be a taper-shaped end portions.

Further, when accommodating the motor within the motor case, the taper-shaped end portions of the terminals are inserted into the U-shaped grooves of the flat base plates, and the flat base plates constituted by the U-shaped grooves and the taper-shaped terminals are brought into contact and connected with each other, in the state mentioned above.

SUMMARY OF THE INVENTION

In accordance with the conventional motor actuator mentioned above, the U-shaped groove is provided in the flat base plate, and the taper-shaped end portion is formed in the leading end of the terminal. Therefore, when forming the flat base plate by a press-drawing work, it is necessary to form it so as to make one end of the U-shaped groove to be open without fail. Further, the leading end of the terminal is formed to be the taper-shaped end portion in a tapered state, and a width of the leading end is formed small. Therefore, it is necessary that the leading end portion is carefully formed so as to be prevented from being curved.

A motor actuator in accordance with the present invention is made by taking the problem mentioned above into consideration, and a first object of the present invention is to extremely easily form a flat base plate extending toward an outer side from a motor and a terminal formed in a coupler in accordance with a pressing work.

A second object of the present invention is to provide a motor actuator which can securely fix and arrange a motor within a motor accommodating hole of a motor case in a pressure-inserted state, can accurately insert and arrange a leading end of a terminal to a connection hole provided in the flat base plate under the state mentioned above, and can improve a productivity.

In order to achieve the object mentioned above, in accordance with a first aspect of the present invention, there is provided a motor actuator structured such that a coupler provided with a motor accommodating hole and terminals is integrally formed within a motor case, a motor is arranged so as to be accommodated within the motor accommodating hole and flat base plates extending to an outer side from an outer periphery of the motor are electrically connected to the terminals, wherein the motor accommodating hole formed within the motor case is continuously formed by a pressure insertion hole and an insertion hole and the insertion hole is formed in an opening portion side of the motor case, wherein the terminals formed in the coupler are arranged in parallel to a longitudinal axis of the motor accommodating hole and are arranged so as to protrude toward the opening portion of the motor case, and wherein, when inserting the motor provided with the flat base plates in an outer periphery thereof into the insertion hole of the motor accommodating hole from the opening portion of the motor case, the terminals are arranged so as to be inserted into the connection holes provided in the flat base plates, and the motor is arranged so as to be pressure-inserted toward the pressure insertion hole of the motor accommodating hole in the state in which the terminals are inserted to the flat base plates.

Further, in accordance with a second aspect of the present invention, in addition to the first aspect, a distance La between a pressure insertion starting point in the opening portion side of the pressure insertion hole of the motor accommodating hole and upper ends in the opening portion side of the terminals is set so as to satisfy a relation of $La>Lb$ with respect to a distance Lb between an insertion side bottom portion of the motor and the flat base plates.

In accordance with the first aspect of the present invention, the motor is arranged so as to be inserted to the insertion hole of the motor accommodating hole from the opening portion of the motor case in a first step, and the terminals are arranged so as to be inserted into the connection holes provided in the flat base plates at that time.

Next, the motor in the state mentioned above is pressure-inserted into the pressure insertion hole of the motor insertion hole in a second step.

In accordance with the structure mentioned above, since the motor is arranged in a sideward free state with a gap within the motor insertion hole at a time of the first step that the motor is inserted into the insertion hole of the motor accommodating hole, it is possible to securely arrange the terminals so as to insert into the connection holes of the flat base plates, by slightly shifting the motor sideward within the insertion hole.

Next, the motor is arranged so as to be pressure-inserted toward the pressure insertion hole of the motor accommodating hole, in a state in which the terminals are inserted into the insertion holes of the flat base plates. Since the terminals are arranged so as to be inserted into the connecting holes of the flat base plates at a time of pressure-inserting the motor into the pressure insertion hole, it is possible to securely pressure-insert the motor into the pressure insertion hole so as to fixedly arrange the motor without deforming the terminals and the flat base plates due to an application of an external force.

Further, the first step and the second step do not require any skill for the work, but can be stably executed and are suitable for an automatic assembly. Accordingly, it is possible to achieve an improvement of a manufacturing quality and an improvement of a production efficiency.

Further, since the circular connecting holes are formed in the flat base plates, and the upper ends of the terminals are formed in the same shape as the base portion thereof and does not require any taper-shaped end portion, it is possible to easily execute the press-drawing work of the flat base plates and the terminals. Especially, any particular attention is not required for managing the shapes of the connecting holes of the flat base plates and the terminals after the press-drawing work.

Further, in accordance with the second aspect of the present invention, since the distance La between the pressure insertion starting point in the opening portion side of the pressure insertion hole of the motor accommodating hole and the upper ends in the opening portion side of the terminals is set so as to be larger than the distance Lb between the insertion side bottom portion of the motor and the flat base plates, it is possible to extremely easily execute the first step and the second step. In other words, it is possible to execute the steps only on the basis of the management of the dimensions La and Lb.

DETAILED DESCRIPTION OF PREFERRED EMBODIMENT

Figure 1:
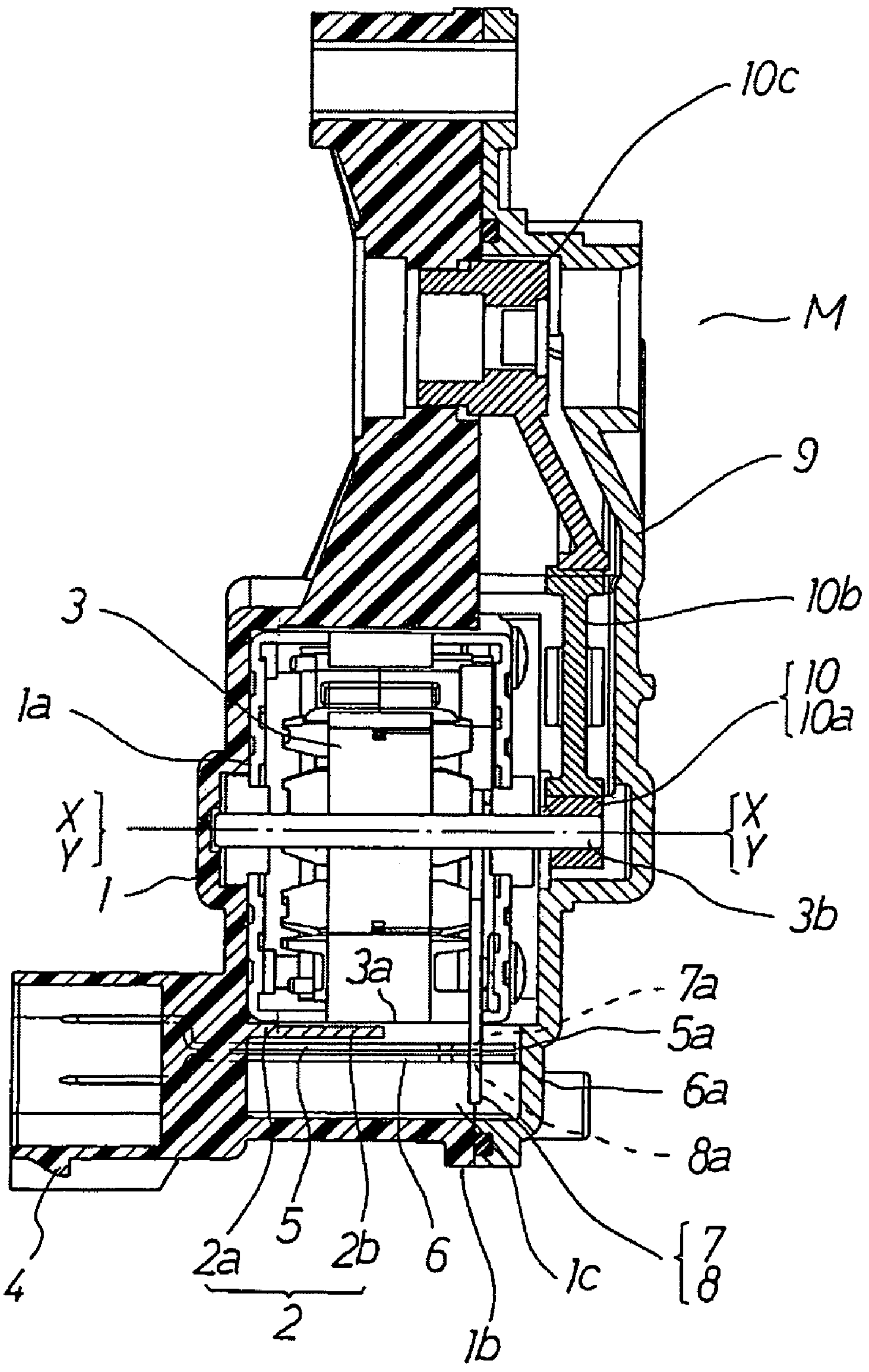
FIG. 1 is a vertical sectional view showing an embodiment of a motor actuator in accordance with the present invention.

A description will be given below of an embodiment of a motor actuator M in accordance with the present invention with reference to FIG. 1. FIG. 1 is a vertical sectional view.

Reference numeral 1 denotes a motor case in which a motor accommodating hole 2 is provided so as to be recessed toward a right mounting collar portion 1*b* from a left bottom portion 1*a*. The motor accommodating hole 2 is open toward a right motor case opening side 1*c*.

The motor accommodating hole is structured such that a pressure insertion hole 2*a* is formed in the bottom portion 1*a* side, and an insertion hole 2*b* is continuously provided in the opening side 1*c* of the motor case, and the insertion hole 2*b* is open to the motor case opening side 1*c*. In order to pressure-insert and support an outer periphery 3*a* of a motor 3 such as a step motor or the like arranged within the motor accommodating hole 2, the pressure insertion hole 2*a* is formed so as to have a smaller diameter than the outer periphery. On the other hand, in order to form a gap with respect to the outer periphery 3*a* of the motor 3, the insertion hole 2*b* is formed so as to have a larger diameter than the outer periphery. Accordingly, the motor 3 is arranged so as to be movable sideward in correspondence to the gap in a state in which the motor 3 is arranged so as to be inserted into the insertion hole 2*b*, and the motor 3 is arranged so as to be fixed to the motor case 1 in a state in which the motor 3 is arranged so as to be pressure-inserted to the pressure insertion hole 2*a*.

Further, a coupler 4 connected to an external power source (not shown) is integrally formed in the motor case 1 so as to protrude to a left side in the drawing, and upper ends 5*a* and 6*a* of plate-shaped or rod-shaped terminals 5 and 6 integrally implanted within the coupler 4 are formed in parallel along a longitudinal axis X-X of the motor accommodating hole 2 and are arranged so as to protrude toward the opening side 1*c* of the motor case 1. In this case, a number of the terminals 5 and 6 is not limited to illustrated two.

The motor is structured such that a coil is arranged in an inner portion thereof, and flat base plates 7 and 8 connected to the coil from the outer periphery 3*a* of the motor 3 are arranged so as to protrude toward a lower side in the drawing.

The flat base plates 7 and 8 are arranged so as to protrude sideward from the outer periphery 3*a* of the motor 3 while being orthogonal to a longitudinal axis Y-Y of the motor 3 (the same direction as the longitudinal axis X-X of the motor accommodating hole 2), and connection holes 7*a* and 8*a* for inserting the upper ends 5*a* and 6*a* of the terminals 5 and 6 are respectively provided in the protruding end portions.

In this case, reference numeral 9 denotes a case cover for closing and holding the opening side 1*c* of the motor case 1 arranged on the mounting collar portion 1*b* of the motor case 1, and reference numeral 10 denotes a gear arranged within a space portion formed by the motor case 1 and the case cover 9. A driving gear 10*a* is connected to the output shaft 3*b* of the motor 3, a rotation of the driving gear 10*a* is transmitted to a driven gear 10*c* via an intermediate gear 10*b*, and a rotation of the output shaft 3*b* of the motor 3 is output to an external portion via the driven gear 10*c*.

In this case, a motor actuator M in accordance with the present invention is formed particularly as follows for achieving the object mentioned above. In order to easily understand, a description will be given by using FIG. 2 which is illustrated briefly.

The motor insertion side bottom portion 3*c* (a lower end of the motor 3 in FIG. 2) of the motor 3, and the flat base plates 7 and 8 are formed with a distance Lb.

Further, the pressure insertion starting point 2*c* in the opening side 1*c* of the motor case 1 of the pressure insertion hole 2*a* of the motor accommodating hole 2, and the upper ends 5*a* and 6*a* of the terminals 5 and 6 are formed with a distance La. In other words, the pressure insertion starting point 2*c* corresponds to a point where the motor insertion side bottom portion 3*c* of the motor 3 is first pressure-inserted to the pressure insertion hole 2*a* at a time when the motor 3 is inserted into the motor accommodating hole 2. Further, the distance La is formed larger than the distance Lb. In this case, the flat base plates 7 and 8 are arranged so as to protrude from the outer periphery 3*a* of the motor 3 while being orthogonal to the longitudinal axis Y-Y of the motor 3, as mentioned above.

Further, the terminals 5 and 6 are arranged in parallel to the longitudinal axis X-X of the motor accommodating hole 2 formed by the pressure insertion hole 2*a* and the insertion hole 2*b*.

A description will be given below of an assembly of the motor actuator in accordance with the present invention having the structure mentioned above.

Figure 2:
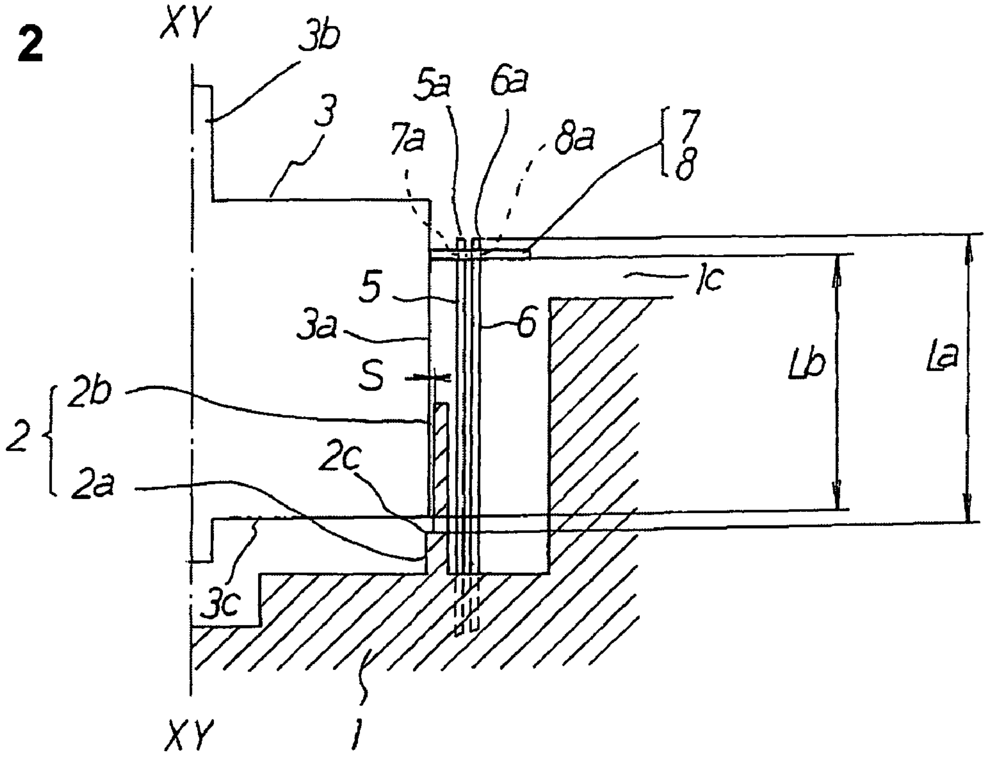
FIG. 2 is a schematic view showing a first step at a time of assembling the motor actuator in accordance with the present invention.

A description will be given by using FIGS. 2 and 3. A first step is shown in FIG. 2, and the motor 3 is arranged so as to be inserted into the insertion hole 2*b* of the motor accommodating hole 2 of the motor case 1.

In other words, the motor 3 is arranged so as to be inserted into the insertion hole 2*b* from the opening side 1*c* of the motor case 1 in a state in which the insertion side bottom portion 3*c* of the motor 3 is set downward. Since the relation of distance La>distance Lb is established as mentioned above, it is possible to arrange so as to insert the upper ends 5*a* and 6*a* of the terminals 5 and 6 into the connection holes 7*a* and 8*a* of the flat base plates 7 and 8 in a state in which the insertion side bottom portion 3*c* of the motor exists within the insertion hole 2*b* and is not pressure-inserted to the pressure insertion hole 2*a* yet.

Further, since a gap S is formed between the outer periphery 3*a* of the motor 3 and the insertion hole 2*b* of the motor accommodating hole 2 at a time of inserting the upper ends 5*a* and 6*a* of the terminals 5 and 6 into the connection holes 7*a* and 8*a* of the flat base plates 7 and 8, it is possible to extremely easily and accurately arrange so as to insert the upper ends 5*a* and 6*a* of the terminals 5 and 6 into the connection holes 7*a* and 8*a*, by shifting in a periphery direction of the motor 3.

Figure 3:
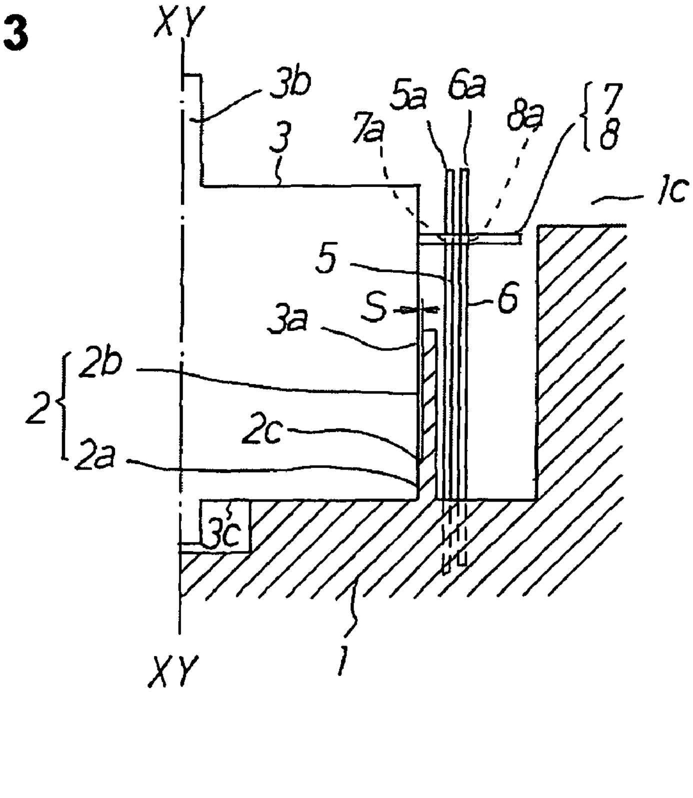
FIG. 3 is a schematic view showing a second step at a time of assembling the motor actuator in accordance with the present invention.

Next, the motor 3 is arranged so as to be pressure-inserted to the pressure insertion hole 2*a* of the motor accommodating hole 2, and the second step is shown in FIG. 3.

Accordingly, since the upper ends 5*a* and 6*a* of the terminals 5 and 6 are already arranged so as to be inserted to the respective connection holes 7*a* and 8*a* of the flat base plates 7 and 8 in the first step, it is sufficient to simply pressure-insert the motor 3 into the pressure insertion hole 2*a* via the pressure insertion starting point 2*c*.

Further, in a state in which the motor 3 is pressure-inserted to the pressure insertion hole 2*a* of the motor accommodating hole 2 and is arranged so as to be accommodated in the motor accommodating hole 2, shown in FIG. 3, the upper ends 5*a* and 6*a* of the terminals 5 and 6 are electrically connected to the connection holes 7*a* and 8*a* of the connection base plates 7 and 8 in accordance with a soldering, an electric resistance welding or the like, the gear 10 constituted by the driving gear 10*a*, the intermediate gear 10*b* and the driven gear 10*c* is connected to the output shaft 3*b* of the motor 3, and the case cover 9 is arranged so as to be screwed on the mounting collar portion 1*b* of the motor 1, whereby the opening side 1*b* of the motor case 1 is closed. Accordingly, the motor actuator M in which the motor 3 is accommodated in the inner portion is formed.

In accordance with the motor actuator M of the present invention having the structure mentioned above, it is possible to insert the upper ends 5*a* and 6*a* of the terminals 5 and 6 into the respective connection holes 7*a* and 8*a* of the flat base plates 7 and 8 of the motor 3 at the same time of accommodating the motor 3 within the insertion hole 2*b* when inserting the motor 3 into the motor accommodating hole 2 of the motor case 1, and the gap S is formed particularly between the outer periphery 3*a* of the motor 3 and the insertion hole 2*b* at that time. Accordingly, it is possible to extremely easily and securely insert the upper ends 5*a* and 6*a* of the terminals 5 and 6 into the respective connection holes 7*a* and 8*a* by slightly shifting the motor 3, whereby the terminals 5 and 6 or the flat base plates 7 and 8 are not bent without necessity of the skill for the work mentioned above.

Further, since the connection holes 7*a* and 8*a* formed in a hole shape are provided in the flat base plates 7 and 8, and it is not necessary to deform the upper ends 5*a* and 6*a* of the terminals 5 and 6 with respect to the shape of the base portions, it is possible to extremely easily press-draw the flat base plates 7 and 8 and the terminals 5 and 6.

Further, since the upper ends 5*a* and 6*a* of the terminals 5 and 6 are already arranged so as to be inserted to the flat base plates 7 and 8 at a time of pressure-inserting the motor 3 into the pressure insertion hole 2*a* of the motor accommodating hole 2, it is sufficient to simply pressure-insert the motor 3 toward the pressure insertion hole 2*b*.

In accordance with the structure mentioned above, it is possible to extremely easily and securely insert and pressure-insert the motor 3 into the motor accommodating hole 2 of the motor case 1, it is possible to automatically assemble the motor actuator easily, and it is possible to achieve an improvement of a quality and an improvement of a production efficiency. Further, since the motor 3 is fixed to the motor case 1 directly by the pressure insertion hole 2*a*, the other members for fixing the motor 3 are not required, and it is possible to fix the motor 3 only by the motor case 1, whereby it is possible to improve an assembling property of the motor actuator.

Figure 4:
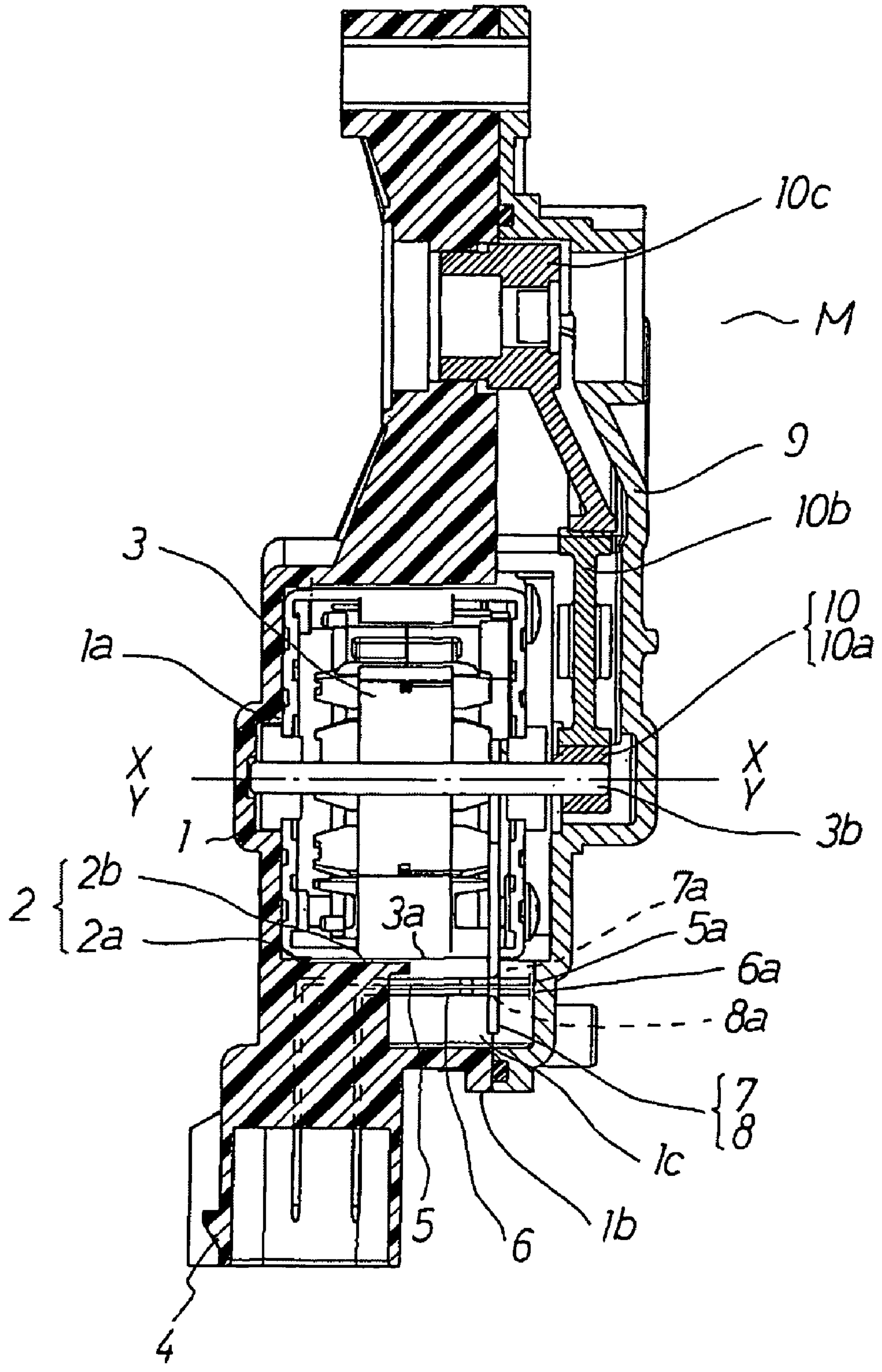
FIG. 4 is a vertical sectional view showing another embodiment of the motor actuator in accordance with the present invention.

Further, an embodiment shown in FIG. 4 is structured such that the coupler 4 is formed toward the side portion while being approximately orthogonal to the longitudinal axis X-X of the motor accommodating hole 2 of the motor case 1. In the structure having the coupler 4 mentioned above, it is possible to achieve the same effect as that of the first embodiment mentioned above by arranging the terminals 5 and 6 protruding toward the opening side 1*c* of the motor case 1 in parallel to the longitudinal axis X-X of the motor accommodating hole 2 in the same manner as the first embodiment, and setting the distance La between the pressure insertion starting point 2*c* in the opening portion side of the pressure insertion hole 2*a* of the motor accommodating hole 2 and the upper ends 5*a* and 6*a* in the opening portion side of the terminals 5 and 6 to the relation of La>Lb with respect to the distance Lb between the insertion side bottom portion 3*c* of the motor 3 and the flat base plates 7 and 8.

In this case, the gear is not always necessary in the motor actuator M in accordance with the present invention, but the gear may be replaced by the other rotation transmitting means, or the output of the motor 3 may be directly taken out by the output shaft 3*b*.

What is claimed is:

1. A motor actuator structured such that a coupler provided with a motor accommodating hole and terminals is integrally formed within a motor case, a motor is arranged so as to be accommodated within said motor accommodating hole, and flat base plates extending to an outer side from an outer periphery of the motor are electrically connected to said terminals, wherein the motor accommodating hole (2) formed within said motor case is formed by a pressure insertion hole (2*a*), which is formed at the side of a bottom portion (1*a*) of the motor case (1) and formed so as to have a smaller diameter than the outer periphery (3*a*) of the motor (3), and an insertion hole (2*b*), which is continuously provided at the side of opening (1*c*) of the motor case (1) from the pressure insertion hole (2*a*) and formed so as to have a larger diameter than the outer periphery (3*a*) of the motor (3), wherein the terminals (5, 6) formed in the coupler (4) are arranged in parallel to a longitudinal axis (X-X) of the motor accommodating hole (2) and is arranged so as to protrude toward the opening portion (1*c*) of the motor case (1), and wherein the flat base plates (7, 8) connected to a coil of the motor (3) are arranged so as to protrude sideward from the outer periphery (3*a*) of the motor (3) while being orthogonal to a longitudinal axis (Y-Y) of the motor (3), and wherein, the terminals (5, 6) are arranged so as to be inserted into the connection holes (7*a*, 8*a*) provided in the flat base plates (7, 8) in a free state that an insertion side bottom portion (3*c*) of said motor is inserted into the insertion hole (2*b*) of the motor accommodating hole (2) from the opening portion (1*c*) of the motor case (1) so as to form a gap (S) between the outer periphery (3*a*) of the motor (3) and the insertion hole (2*b*), and the insertion side bottom portion (3*c*) of the motor (3) is pressure-inserted toward the pressure insertion hole (2*a*) of the motor accommodating hole (2) in a state that the terminals (5, 6) are inserted to the flat base plates (7, 8), whereby the outer periphery (3*a*) of the motor (3) is fixedly arranged in the pressure insertion hole (2*a*).

2. A motor actuator structured such that a coupler provided with a motor accommodating hole and terminals is integrally formed within a motor case, a motor is arranged so as to be accommodated within said motor accommodating hole, and flat base plates extending to an outer side from an outer periphery of the motor are electrically connected to said terminals, wherein the motor accommodating hole (2) formed within said motor case is formed by a pressure insertion hole (2*a*), which is formed at the side of a bottom portion (1*a*) of the motor case (1) and formed so as to have a smaller diameter than the outer periphery (3*a*) of the motor (3), and an insertion hole (2*b*), which is continuously provided at the side of opening (1*c*) of the motor case (1) from the pressure insertion hole (2*a*) and formed so as to have a larger diameter than the outer periphery (3*a*) of the motor, wherein the terminals (5, 6) formed in the coupler (4) are arranged in parallel to a longitudinal axis (X-X) of the motor accommodating hole (2) and is arranged so as to protrude toward the opening portion (1*c*) of the motor case (1), wherein the flat base plates (7, 8) connected to a coil of the motor (3) are arranged so as to protrude sideward from the outer periphery (3*a*) of the motor (3) while being orthogonal to a longitudinal axis (Y-Y) of the motor (3), wherein a distance La between a pressure insertion starting point (2*c*) at the opening portion (1*c*) side of the pressure insertion hole (2*a*) of said motor accommodating hole and upper ends (5*a*, 6*a*) at the opening portion (1*c*) side of the terminals (5, 6) is set so as to satisfy a relation of La>Lb with respect to a distance Lb between an insertion side bottom portion (3*c*) of the motor (3) and the flat base plates (7, 8), and wherein the terminal (5, 6) are arranged so as to be inserted into the connection holes (7*a*, 8*a*) provided in the flat base plates (7, 8) in a free state that an insertion side bottom portion (3*c*) of said motor is inserted into the insertion hole (2*b*) of the motor accommodating hole (2) from the opening portion (1*c*) of the motor case (1) so as to form a gap (S) between the outer periphery (3*a*) of the motor (3) and the insertion hole (2*b*) and the insertion side bottom portion (3*c*) of the motor (3) is pressure-inserted toward the pressure insertion hole (2*a*) of the motor accommodating hole (2) in a state that the terminals (5, 6) are inserted to the flat base plates (7, 8), whereby the outer periphery (3*a*) of the motor (3) is fixedly arranged in the pressure insertion hole (2*a*).

* * * * *